United States Patent Office 2,897,123
Patented July 28, 1959

2,897,123

PLASMINOGEN STERILIZATION

Heron O. Singher, Plainfield, N.J., assignor to Ortho Pharmaceutical Corporation, a corporation of New Jersey No Drawing. Application September 21, 1956
Serial No. 611,382

5 Claims. (Cl. 195—66)

This invention relates to a method of sterilizing plasminogen and, more particularly, to a process for destroying the hepatitis virus in plasminogen derived from human blood.

It is well established that a proteolytic enzyme is present in normal blood in the form of an inert precursor, plasminogen, which is mainly attached to the globulin fraction, for example Cohn, fraction $III_3$. Plasminogen, when activated by bacterial filtrates such as staphylokinase, streptokinase, or by tissue extracts—fibrinolysokinase, is converted into plasmin which attacks the coagulation proteins. Inhibitors usually present with the plasminogen retard this reaction.

According to the theory of Mullertz and Lassen (Proceedings of the Society for Experimental Biology and Medicine, 82, 264 (1954)), streptokinase and presumably tissue kinases do not activate plasminogen directly but an inactive precursor of the activator which would then convert plasminogen to plasmin. Regardless, however, of the exact mechanism of fibrinolysis, it has been shown that fibrin is aseptically dissolved by plasminogen activated by streptokinase and streptodornase.

The intrathecal use of plasminogen activated by streptokinase to lyse tuberculosis exudates in vivo has been reported by Fletcher in the Journal of Clinical Investigations, 33, 1242–1251 (1954). Margulis has described the use of plasmin to liquify blood clots in thirty-eight patients (Archives of Surgery, 65, 511–521, 1952). Activated plasminogen also finds use in the debridement of wounds, burns, in the treatment of chronic ulcers and in draining sinuses. Contamination of plasminogen with the hepatitis virus has constituted a serious health hazard and discouraged its wider use by the medical profession.

It is the object of the present invention to prepare plasminogen that is not contaminated with the hepatitis virus and therefore is completely safe for human use.

It is another object of this invention to prepare a sterile plasminogen having a high degree of activity.

Still another object of my invention is to increase the activity of the plasminogen by removing inhibitors.

The existing methods of destroying the hepatitis virus are nitrogen mustard, $\beta$-propiolactone, high energy irradiation and heat. Neither the nitrogen mustard nor the $\beta$-propiolactone have been universally effective. High energy irradiation in appropriate dosage is effective but when applied to products derived from human blood, destroys biologically active material at the same time. Heat, 60° C. for 10 hours, higher temperatures for shorter intervals or lower temperatures for very long intervals, e.g., 37° C. for six months have proven effective on known infected biological materials. In general, however, biological materials are not stable, i.e., they lose their specific activities at these temperatures and durations. I have discovered a method for heat-treating plasminogen and fractions containing plasminogen so that the hepatitis virus is destroyed. Under the conditions elaborated below, this is accomplished without diminishing the activity of the plasminogen. Indeed, the plasminogen activity is actually increased by my process indicating an increase in purity. The problems that are encountered in carrying out my process are best divided into two parts. First, the conditions for heat-treating the material and second, the procedures employed for sterile filtering the heat-treated material.

Proteins are dipolar molecules, i.e., they can act as either acids or bases depending on the nature of the medium in which they are placed. There is defined for each protein an isoelectric point at which they are electrically neutral in solution. Acid to this point, the protein molecule carries a net positive charge and alkaline to it, a net negative charge. The protein concentration and the salt content of the solution, as well as ionic strength of the solution, also effect the nature of the material in solution since combination can occur at higher protein concentrations and at low ionic strengths. Proteins also interact with impurities, other proteins or smaller ions, when they coexist under appropriate conditions in the same solution.

Plasminogen is a protein and the precursor of an enzyme (plasmin or fibrinolysin). It exists in the plasma of many species particularly in human plasma. It can be obtained in various degrees of purity and in various fractions of plasma. For example, in method 10 of plasma fractionation developed by Cohn and his associates (Journal of Clinical Investigations, 30, 99–111 (1951)), plasminogen is found in fractions I and III. Employing methods 6 and 9 of Cohn, the plasminogen component will be concentrated in fraction $III_3$ (see the article on Blood Fractionation in the Encyclopedia of Chemical Technology, published by the Interscience Encyclopedia, Inc., Brooklyn, New York).

When plasminogen is obtained from any of these fractions, it can be dissolved in concentrations of less than 10 percent (100 milligrams per milliliter), preferably 5 percent (50 milligrams per milliliter) in an aqueous solution of pH 3.0–pH 6.5, preferably pH 4. The ionic strength of this solution should lie below 0.3, preferably about 0.15. In solutions of this nature, it is possible to heat-treat plasminogen for 10 hours at 60° C. Plasminogen so treated has been used in human beings without producing hepatitis infections.

After plasminogen or plasminogen-containing fractions have been heat-treated, they may possess properties that make them difficult to filter, e.g., particle size, absorption on heat-denatured materials, etc. These properties can be overcome by readjusting the pH to neutrality (6.5–8.0) and bringing the ionic strength to 0.15–0.3 where necessary.

EXAMPLE I

Two and twenty-seven hundredths parts of a highly concentrated form of plasminogen obtained from the blood of the human placenta and assaying 9,500 units of activity per milligram of dry weight were dissolved in 454 parts of distilled water and the pH adjusted to 4.0 with HCl. This solution was heated at 60° C. for 10 hours and then centrifuged. The supernatant was adjusted to pH 7.2 by the additions of 1 N sodium hydroxide. 3.87 parts of sodium chloride were added to the solution which was then sterile filtered and lyophilized. The resulting product assayed 13,200 units per milligram of dry weight.

EXAMPLE II

Twelve and seven-tenths parts of plasminogen containing fraction $III_3$ (obtained by methods 6 and 9 of Cohn) were dissolved in 498.3 parts of water and adjusted to pH 4.0 with HCl. This solution was heated at 60° C. for 10 hours and then centrifuged. To the supernatant, 8.55 parts of sodium chloride was added. The pH was adjusted to 8.0 and the material was sterile filtered and lyophilized. The final potency of the product was 18,200 units per milligram of dry weight.

In determining the activity of the plasminogen derived according to Examples I and II, the following method was employed. The House Standard sample of plasminogen had an activity of 11,000 units per milligram of dry weight.

*Plasminogen assay fibrin clot method*

A. SOLUTIONS (1) Saline—0.0 percent: Dissolve 9 grams of sodium chloride C.P. in 1000 milliliters of distilled water.
(2) Standard plasminogen—house standard: Ten milligrams are weighed on an analytical balance and diluted to 1000 milliliters with saline in a volumetric flask. Make fresh each time.
(3) Unknown solutions:
10 milligrams in 1000 milliliters of saline.[1]
20 milligrams in 1000 milliliters of saline.[1]
20 milligrams in 500 milliliters of saline.[1]
30 milligrams in 500 milliliters of saline.[1]
20 milligrams in 250 milliliters of saline.[1]
10 milligrams in 100 milliliters of saline.[1]
20 milligrams in 1000 milliliters of saline.[1]

[1] Use 0.4 milliliter per test.

20 milligrams in 5000 milliliters of saline. Make fresh each time.
(4) Phosphate saline buffer: 0.1 mole monosodium phosphate dissolved in about 600 milliliters of saline in a liter volumetric flask adjusted to pH 7.4 with sodium hydroxide and make to volume. Use 2 milliliters per test. May be stored.
(5) Fibrinogen gelatin solution: Use 2 milliliters per test. Solution contains 2.5 grams of gelatin and 0.5 gram of bovine fibrinogen (fraction I). Heat 50 milliliters of phosphate saline buffer to boiling, remove from heat and stir in gelatin. Cool to 37° C. and adjust to 50 milliliters with distilled water. Add gelatin solution to 0.5 gram of fibrinogen and mix with a stirring rod in 37° C. water bath until the fibrinogen is dissolved. Keep at 37° C. until used. Make fresh each day.
(6) Streptokinase—varidase: Dissolve a 20,000 unit vial in 4 milliliters of saline. Use 0.05 milliliter—250 units—per test. Make fresh each day.
(7) Thrombin: Dissolve thrombin in sufficient saline to give 10 National Institutes of Health units per 0.05 milliliter. Use 0.05 milliliter per test. Make fresh each day.

B. METHOD (1) Set up 10 pairs of photoelectric colorimeter tubes in a rack and number 1 to 10 in duplicate.
(2) To pairs 1 to 9, add 2 milliliters of phosphate saline buffer.
(3) To pair 10, add 2.4 milliliters of phosphate saline buffer (negative control).
(4) To pair 1, add 0.4 milliliter of standard plasminogen.
(5) To pairs 2 to 9, add 0.4 milliliter of appropriate unknown.
(6) Add 2.0 milliliters of fibrinogen gelatin to each tube.
(7) Add 0.1 milliliter of saline to the first tube of each pair.
(8) Add 0.05 milliliter of streptokinase to the second tube of each pair.
(9) Mix tubes placing a square of Parafilm over each tube and inverting thrice.
(10) Place racks with tubes in constant temperature water bath at 25° C. immersing to the level of the reagents.
(11) Have photoelectric colorimeter adjusted, wave length 660 mu.
(12) Add 0.05 milliliter of thrombin solution to the second tube of each pair, one every minute in succession. Mix each tube after addition. Start timing from the addition to tube 1.
(13) Use first tube of pair 10 to adjust sensitivity.
(14) Use first tube of each pair for zero adjustment and read transmission before reading transmission of the second tube of the pair.
(15) Read each pair one minute after the preceding pair and once every ten minutes until the second tube of each pair reads 100 percent transmission or until 120 minutes have passed. Record time and transmission for each reading.

C. CALCULATIONS

½ *lysis.*—Subtract the first reading from 100 percent and divide the difference by two and add to the first reading. This value is the percent transmission at ½ lysis.

½ *lysis time.*—Make a linear graph plotting transmission on the ordinate and time in minutes on the abscissa. Plot the readings on either side of the calculated ½ lysis. Connect the points and read from the graph the time, corresponding to the calculated ½ lysis. This is the ½ lysis time.

Employing the graph of ½ House Standard (½ lysis time plotted on the ordinate against the units of activity per milligram of House Standard plasminogen plotted on the abscissa) check the ½ lysis time of the unknown against the House Standard. Read the unitage off the curves for each ½ lysis time of the unknown.

$$\frac{\text{Unitage}}{0.4} \times \frac{\text{ml. of saline}}{\text{mgm. in solution}}$$

=activity in units/mg. dry weight

Although human blood was used as the source of plasminogen in the preceding examples, any other source of plasminogen from mammalian blood, such as bovine blood, may be used and treated by the same process. While destruction of the hepatitis virus is only a problem when the blood source is human, the process described is effective in obtaining a plasminogen free of inhibitors.

What is claimed is:

1. A method of treating plasminogen which comprises heat-treating at a temperature of about 60° C. for about 10 hours an aqueous solution of plasminogen having a pH not less than 3 and not greater than 6.5, and an ionic strength not greater than 0.3.

2. A method of treating plasminogen which comprises heat-treating at a temperature of about 60° C. for about 10 hours an aqueous solution of plasminogen having a pH not less than 3 and not greater than 6.5, and an ionic strength not greater than 0.3; the amount of plasminogen in said aqueous solution being not more than 10 percent by weight.

3. A method of treating plasminogen which comprises heat-treating at a temperature of about 60° C. for about 10 hours an aqueous solution of plasminogen having a pH not less than 3 and not greater than 6.5, and an ionic strength not greater than 0.3; readjusting the acidity of the solution to a pH range of not less than 6.5 and not greater than 8, maintaining the ionic strength below 0.3 and filtering.

4. A method of treating plasminogen which comprises heat-treating at a temperature of about 60° C. for about 10 hours an aqueous solution of plasminogen having a pH of about 4, and an ionic strength not greater than 0.3.

5. A method of treating plasminogen which comprises heat-treating at a temperature of about 60° C. for about 10 hours an aqueous solution of plasminogen having a pH of about 4, and an ionic strength not greater than 0.3; readjusting the acidity of the solution to approximate neutrality, maintaining the ionic strength below 0.3, and filtering.

References Cited in the file of this patent

UNITED STATES PATENTS 2,469,193   Cohen _____ May 3, 1949

OTHER REFERENCES

Kline: J. of Biol. Chem., vol. 204, October 1953, pp. 949–955.

U.S. Disp., J. B. Lippincott Co., Philadelphia, 1955, 25th ed., p. 33.

Remmert: J. of Biol. Chem., vol. 181, November 1949, pp. 431–447.